(12) United States Patent
Guldenfels et al.

(10) Patent No.: US 8,668,075 B2
(45) Date of Patent: Mar. 11, 2014

(54) CLEANING-IN-PLACE SYSTEM

(75) Inventors: Dieter Guldenfels, Pfeffingen (CH); Marco Lucchi, Munchestein (CH)

(73) Assignee: Habasit AG, Reinach (CH)

( * ) Notice: Subject to any disclaimer, the term of this patent is extended or adjusted under 35 U.S.C. 154(b) by 306 days.

(21) Appl. No.: 12/288,602

(22) Filed: Oct. 22, 2008

(65) Prior Publication Data
US 2009/0050185 A1 Feb. 26, 2009

Related U.S. Application Data

(63) Continuation-in-part of application No. 11/672,568, filed on Feb. 8, 2007.

(51) Int. Cl.
*B65G 45/22* (2006.01)

(52) U.S. Cl.
USPC .......................................................... 198/495

(58) Field of Classification Search
USPC .............. 198/495, 845; 134/122 R, 124, 131; 474/92
See application file for complete search history.

(56) References Cited

U.S. PATENT DOCUMENTS

| | | | |
|---|---|---|---|
| 1,668,778 A | 5/1928 | Menningen | |
| 1,922,357 A | 8/1933 | Divney et al. | |
| 1,934,819 A | 11/1933 | Rorabeck | |
| 3,016,235 A * | 1/1962 | Cnudde | 432/228 |
| 3,017,986 A | 1/1962 | Ackles | |
| 3,031,895 A | 5/1962 | Kindig | |
| 4,218,932 A | 8/1980 | McComber | |
| 4,816,010 A | 3/1989 | Reynolds | |
| 6,223,905 B1 * | 5/2001 | Buisman et al. | 209/261 |
| 6,367,613 B1 | 4/2002 | Montgomery | |
| 6,740,172 B1 | 5/2004 | Griffiths et al. | |
| RE38,607 E | 10/2004 | Guldenfels et al. | |
| 6,978,880 B2 | 12/2005 | Barrett | |
| 7,055,675 B2 * | 6/2006 | Behymer et al. | 198/496 |
| 7,111,724 B2 * | 9/2006 | Donnenhoffer | 198/807 |
| 7,147,099 B2 * | 12/2006 | Guernsey et al. | 198/834 |
| 7,225,915 B2 * | 6/2007 | Kelly et al. | 198/495 |
| 7,370,749 B2 * | 5/2008 | Smith | 198/495 |
| 7,407,051 B1 * | 8/2008 | Farris et al. | 198/495 |
| 2004/0222072 A1 | 11/2004 | Verdigets et al. | |
| 2007/0084699 A1 | 4/2007 | Smith | |

FOREIGN PATENT DOCUMENTS

WO 2008/006232 A1 1/2008

\* cited by examiner

*Primary Examiner* — Douglas Hess
(74) *Attorney, Agent, or Firm* — Hodgson Russ LLP

(57) ABSTRACT

A cleaning-in-place system for use with an easily cleanable modular belt. The belt has modules with a body having a first opening formed between adjacent pairs of teeth. The opening extends toward the center of the sprocket to provide access to the hinge area, when the belt engages with the sprocket, for application of cleaning fluid.

9 Claims, 16 Drawing Sheets

CLEANING-IN-PLACE SYSTEM

CROSS-REFERENCE TO RELATED APPLICATION

The present application is a continuation-in-part of U.S. patent application Ser. No. 11/672,568 filed on Feb. 8, 2007, which is incorporated herein by reference.

FIELD OF THE INVENTION

The present invention relates to modular conveying apparatus.

BACKGROUND OF THE INVENTION

Sprockets for driving modular belts are usually made from stainless steel or plastic that is machined or molded. In food processing applications, sprocket drives are a particularly critical area for cleaning. It is important to be able to periodically remove the residual matters totally from the sprockets and on the rear side of the belt, in order to avoid bacteria growth and spoilage of the food processed on the belt. For this purpose sprockets have been designed with large openings to allow cleaning fluid to pass from the side and reach the critical areas to be cleaned.

Such sprockets are disclosed in U.S. Pat. No. Re. 38,607. Typically, the sprocket rim and teeth are covering the hinges and hinder the fluid from reaching the hinge area for proper cleaning. Therefore the sprocket disclosed in the patent further provides pairs of teeth in a double row such that the teeth of a pair are offset. This arrangement allows better cleaning access to the rear belt side and easier release of residual matters collected on the rear belt side. But this design is only partially solving the problem since the critical hinge areas are still covered by the sprocket rim to a certain extent, when engaged on the sprocket. Therefore good access to these hinges is of primary importance.

U.S. Patent Publication No. 2004/0222072 proposes to solve this problem by using a sprocket with an oblique shape as illustrated in FIGS. 3A, 3B of the publication. With this design, the teeth will laterally change their position on the rear side of the belt and regularly expose another place on the belt for better cleaning access. Although this is improving cleanability, the proposed solution is still having the shortcoming of periodically covering the hinge completely in a certain position. Another typical feature of the disclosed sprocket is the tracking on the belt by additional teeth engaging in the hinge gaps (FIG. 3B, reference no. 74). During sprocket engagement these teeth enter into the hinge gap between two links and thus push residual matter into this gap, making it again difficult to clean. Also, the drive pockets (reference 72 as shown in FIG. 3A of the publication) of the sprocket are engaging closely over the drive faces which are identical with the center cross bar on the rear side of the belt. The drive surfaces totally covered by the enclosing drive pocket are another place where residuals are physically squeezed in between thus making cleaning more difficult.

Another patent proposing a similar solution is U.S. Pat. No. 6,740,172. The patent does not disclose the drive engagement but discloses sectional sprockets used to laterally shift the engagement area periodically. Accordingly, there is a need for an improved sprocket for easy cleaning that avoids the above described shortcomings.

SUMMARY OF THE INVENTION

The present invention meets the above described need by providing a drive sprocket for driving a modular belt having a plurality of belt modules with intercalated link ends connected by transverse pivot members to form hinges. The belt modules may have transverse ribs. The drive sprocket is driven by a shaft. The drive sprocket has a central opening for receiving the shaft. The body has a plurality of teeth disposed in pairs along a periphery of the body. The body has a first opening formed between adjacent pairs of teeth and extending toward the center of the sprocket to provide access to the hinge area, when the belt engages with the sprocket, for application of a cleaning medium or other medium as discussed in greater detail herein.

The sprocket may also be provided with a curved recessed portion adjacent to the first opening. A plurality of second openings may be disposed in the body of the sprocket between the central opening and the first opening.

The pairs of teeth may be arranged in offset fashion with respect to a central axis or the teeth may extend for the entire width of the sprocket.

A cleaning system may be arranged proximate to the sprockets such that a cleaning medium is sprayed through the curved recessed portion into the opening disposed adjacent to the hinge of the belt when the belt engages with the sprocket. The cleaning system may include a manifold in combination with spray heads pointed toward the sprocket.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
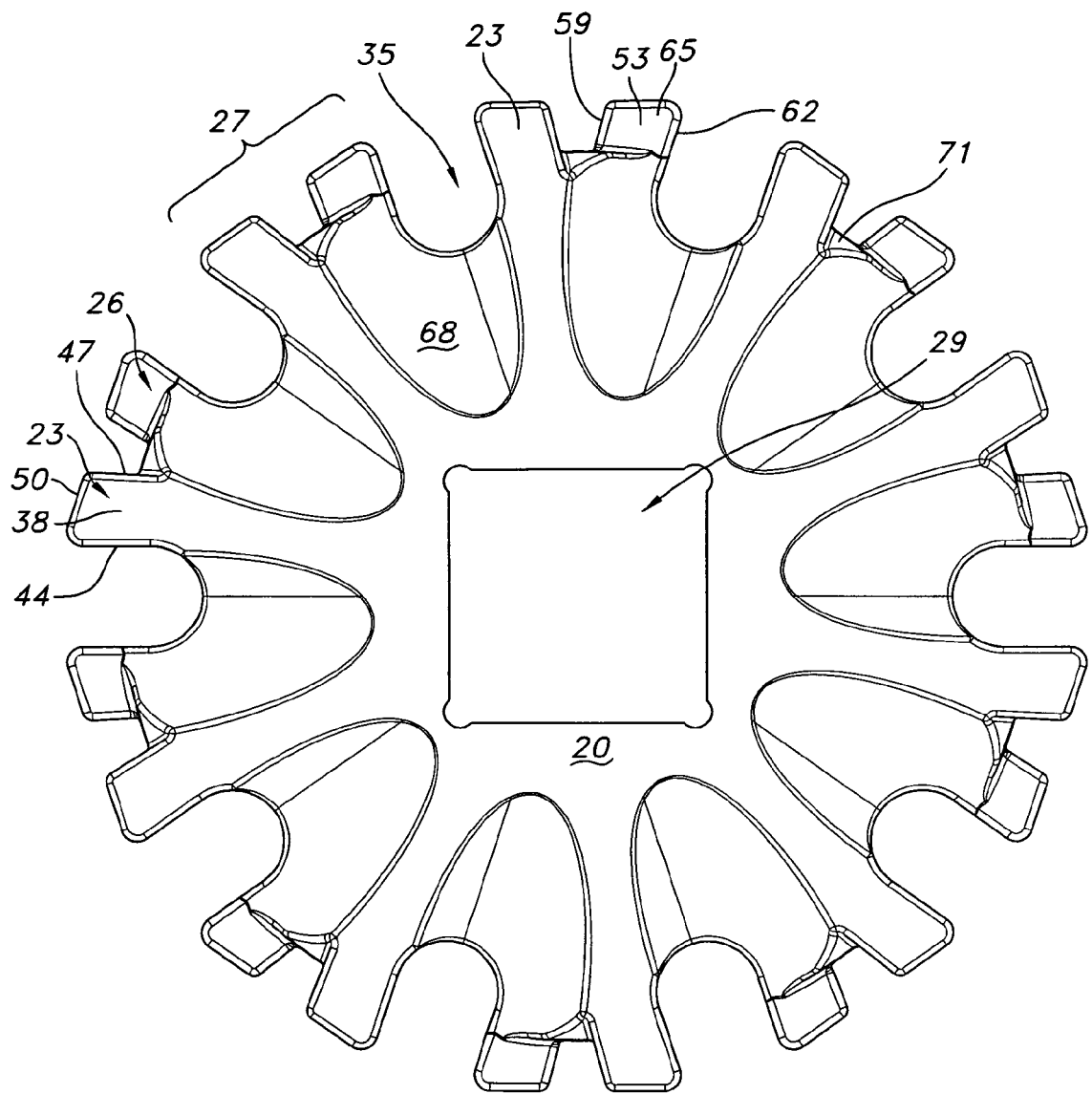
FIG. 1 is a side elevational view of a sprocket according to a first embodiment of the present invention.
Figure 3:
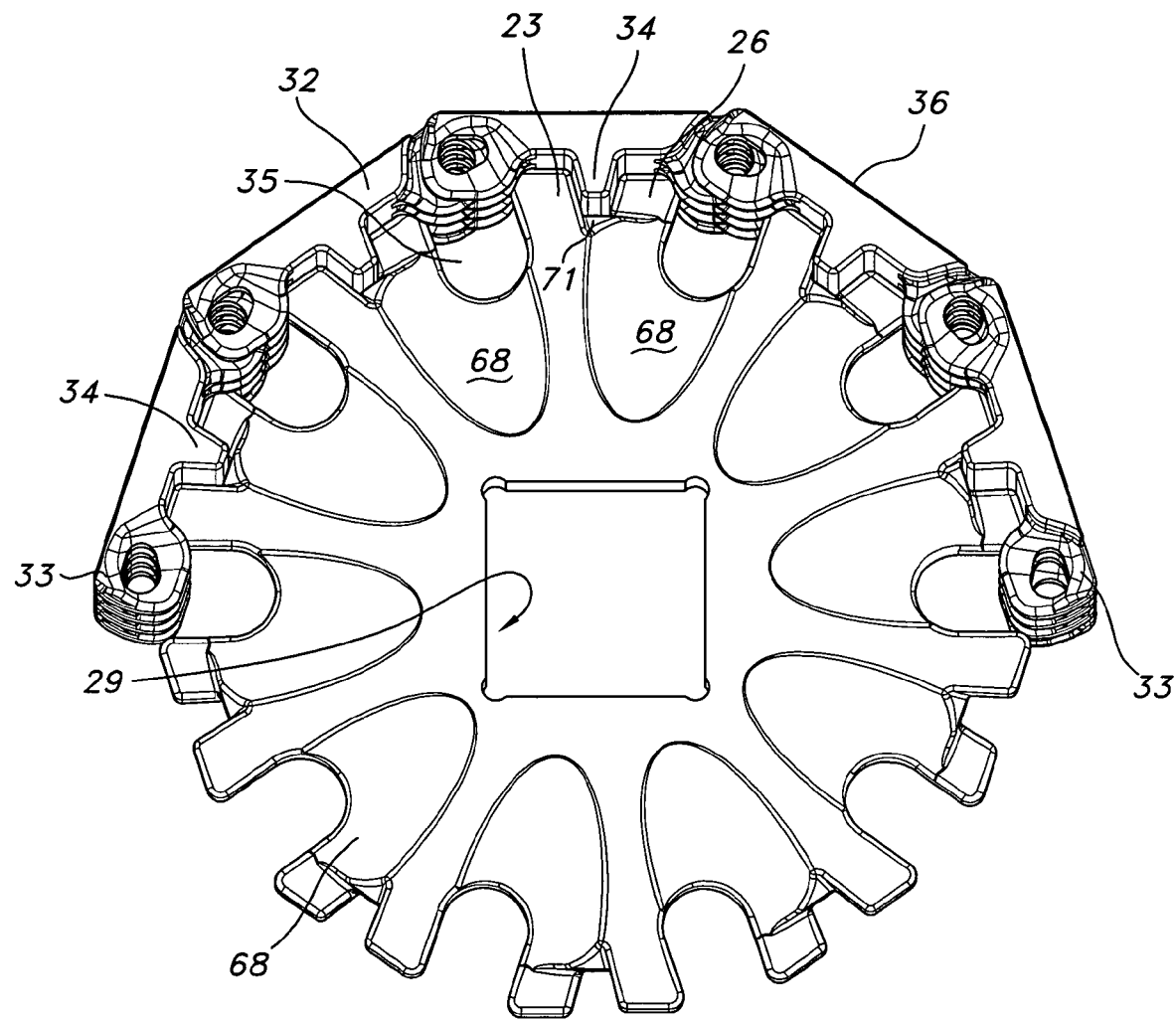
FIG. 3 is a side elevational view of the sprocket shown in FIG. 1 with a modular belt engaged thereon.

Referring initially to FIG. 1, a drive sprocket 20 has a plurality of sprocket teeth 23, 26 disposed in pairs 27 around the periphery of the sprocket 20. The sprocket 20 also has a central opening 29 that is formed in the shape of a square. The square shaped opening 29 is sized to receive a square shaft (not shown) for rotating the sprocket 20 to drive a modular belt 32 (FIG. 3). The central opening 29 may be formed in other shapes to accommodate different shaft geometries as will be evident to those of ordinary skill in the art based on this disclosure. A large first opening 35 which may be oval-shaped as shown is formed in the body of the sprocket 20. The first opening 35 is located between adjacent pairs 27 of teeth and is arranged such that it aligns with the hinge area of the modular belt 32 when the belt 32 is engaged with the sprocket 20 as best shown in FIG. 3. As shown the teeth 23 are formed by a pair of side walls 38, 41 (opposite to wall 38); a pair of end walls 44, 47; and a top wall 50. The teeth 26 are formed by a pair of side walls 53, 56 (opposite to wall 53); a pair of end walls 59, 62; and a top wall 65. The top walls 50 and 65 are angled relative to their respective side walls such that the top walls 50 and 65 are disposed in spaced apart relation and somewhat aligned with respect to their planar top surfaces. The sprocket 20 also has recessed curved portions 68 extending from the end of the first openings 35 toward the center of the sprocket 20. The curved recessed portions 68 extend toward the teeth 23, 26 and terminate at a shelf-like portion 71 between the respective teeth.

Figure 2:
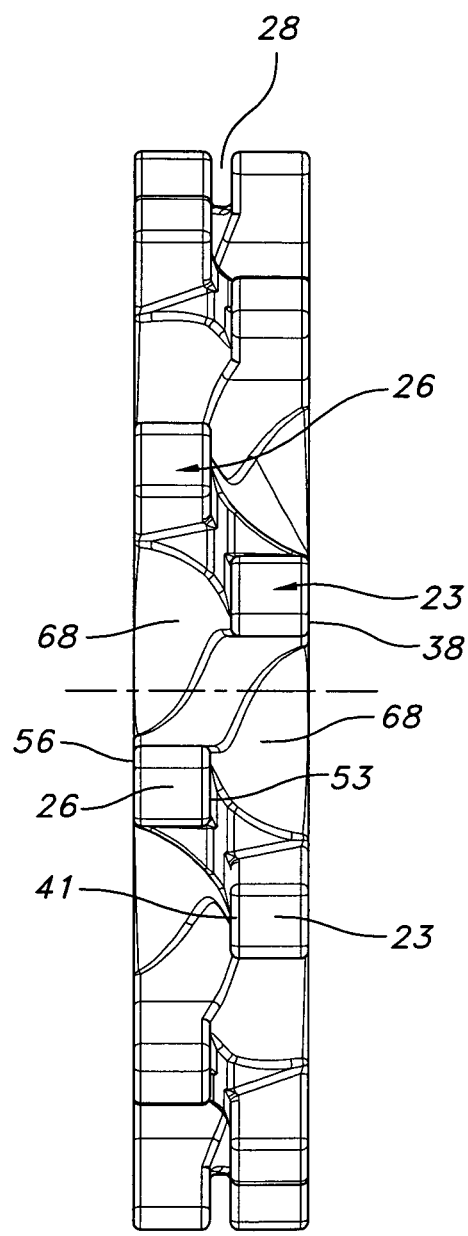
FIG. 2 is an end elevational view of the sprocket shown in FIG. 1.

Turning to FIG. 2, the teeth 23, 26 are disposed in two rows along the periphery of the drive sprocket 20. The teeth 23, 26 are offset along the circumference of the sprocket and are disposed on opposite sides of a central axis 28 such that during driving of the modular belt 32 one of the teeth engages with one of the link ends 33 of the belt 32 and another tooth engages with the transverse rib 34 on the belt 32. The shelf portion 71 extends between adjacent teeth 23, 26 and is bordered on opposite sides by the curved recessed portions 68.

Turning to FIG. 3, the sprocket 20 is shown engaged with the modular belt 32. The teeth 23, 26 engage with the link ends 33 and transverse rib 34 of the respective belt modules 36. The teeth 23, 26 fit on opposite sides of the transverse rib 34 and provide tracking for the belt 32. Also, the first openings 35 provide large openings and improved access to the hinge areas for cleaning when the belt 32 passes over the drive sprocket 20. The curved recessed portions 68 also provide room near the hinge and guide the cleaning medium into the critical hinge area. The cleaning medium may comprise a liquid, gas, a mixture of liquid and gas, a dust, a foam or any other form suitable for cleaning. The medium may also serve other purposes in place of or in addition to cleaning such as sanitation or drying.

Figure 4:
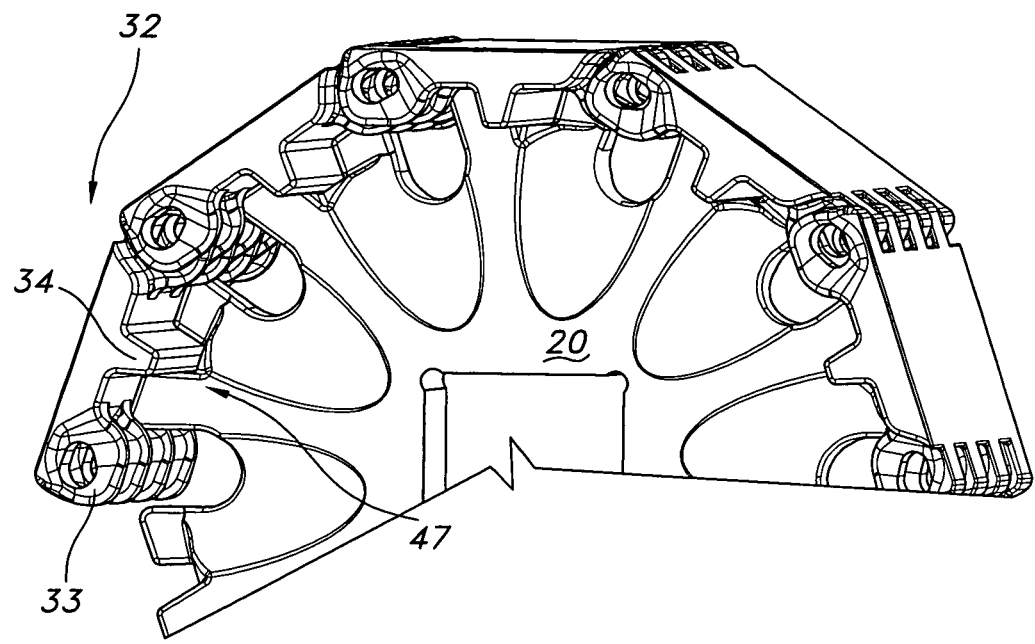
FIG. 4 is a perspective view thereof.
Figure 5:
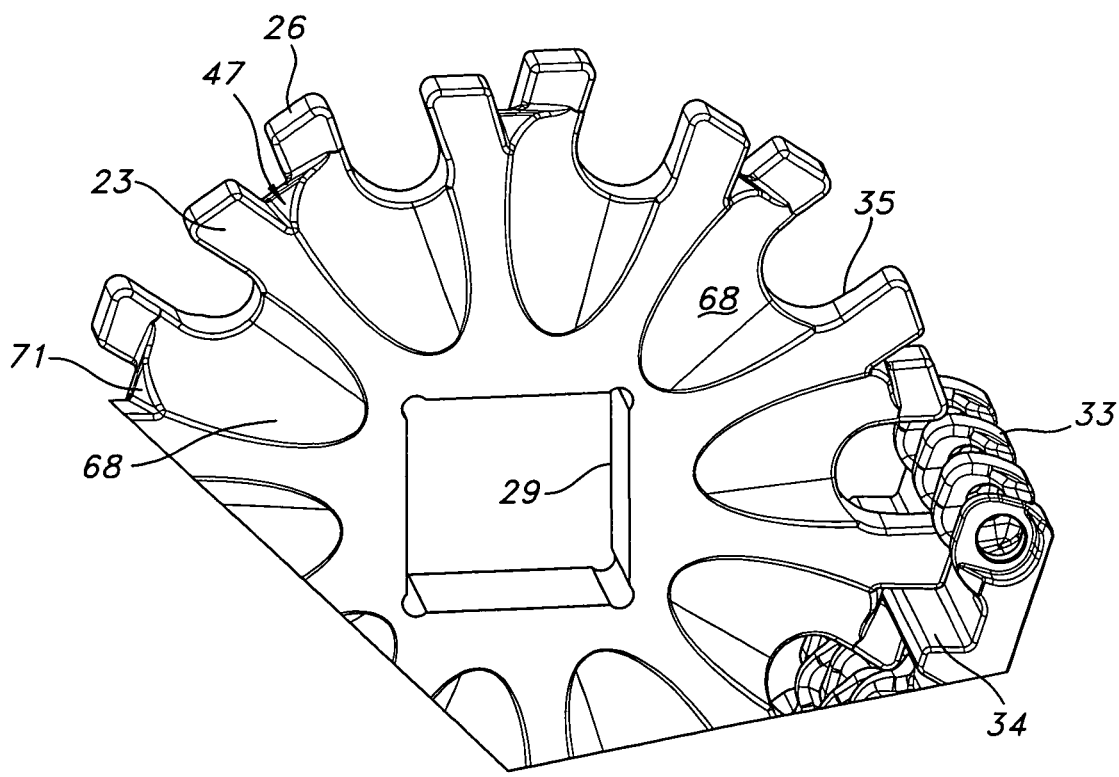
FIG. 5 is another perspective view thereof.

Turning to FIGS. 4 and 5, the end wall 47 of the tooth 23 may be disposed at an angle such that the face of the tooth 23 reduces the contact surface to the belt 32 and "squeezes" away residuals that may become trapped between the belt 32 and the sprocket 20.

Figure 6:
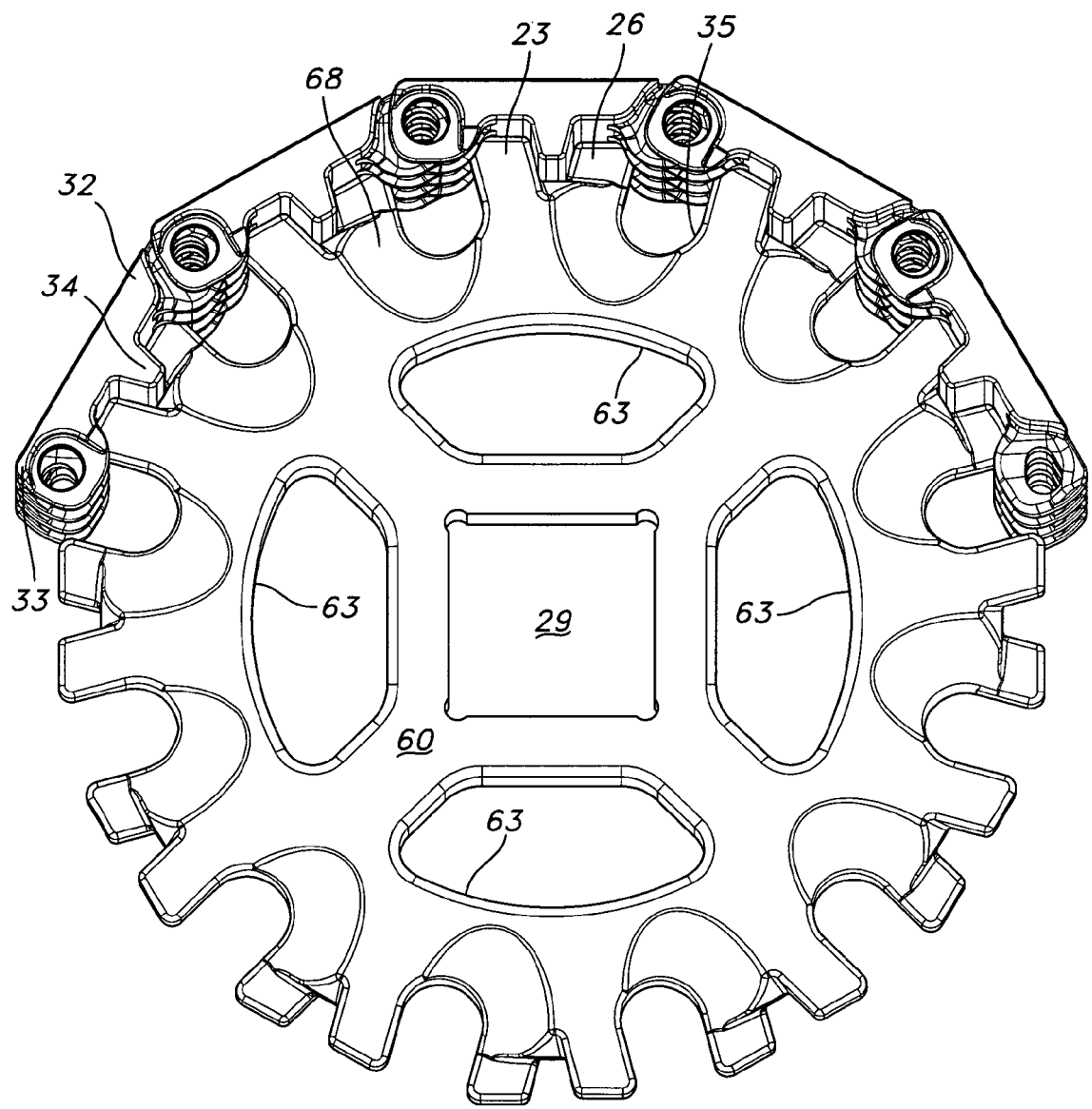
FIG. 6 is an alternate embodiment of the sprocket of the present invention.

In FIG. 6, an alternate embodiment of the sprocket 20 is shown. Sprocket 60 has the same design for the teeth 23, 26 and the first openings 35 and curved, recessed portions 68 but also includes openings 63 which are relatively large and are positioned around the periphery of the central shaft opening. The openings 63 may be desired to improve the accessibility for water jets or the like applied from the sides of the sprocket 60. This alternate design does not necessarily improve the cleaning of the hinge areas.

Figure 7:
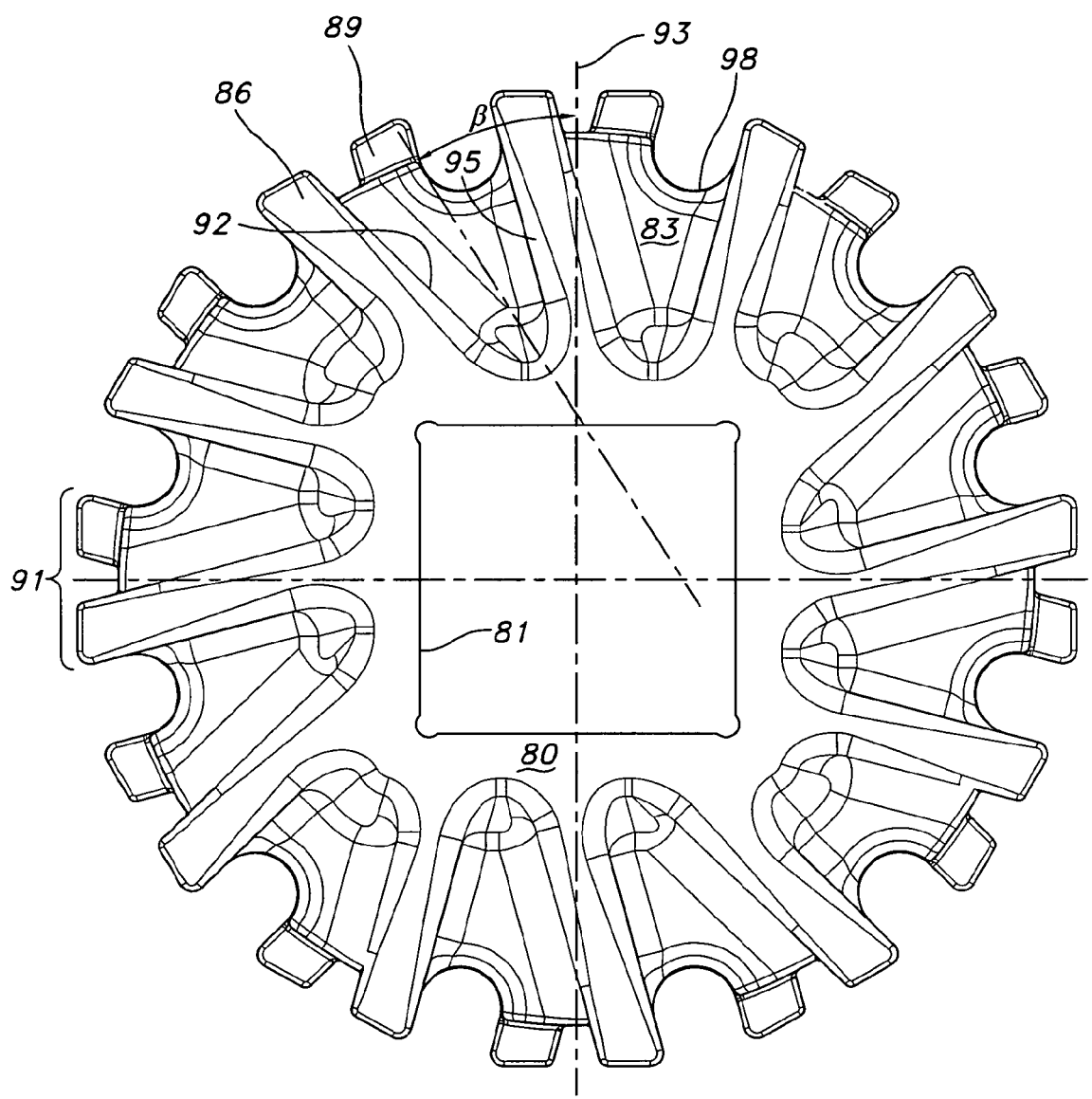
FIG. 7 is a side elevational view of another alternate embodiment of the present invention.
Figure 8:
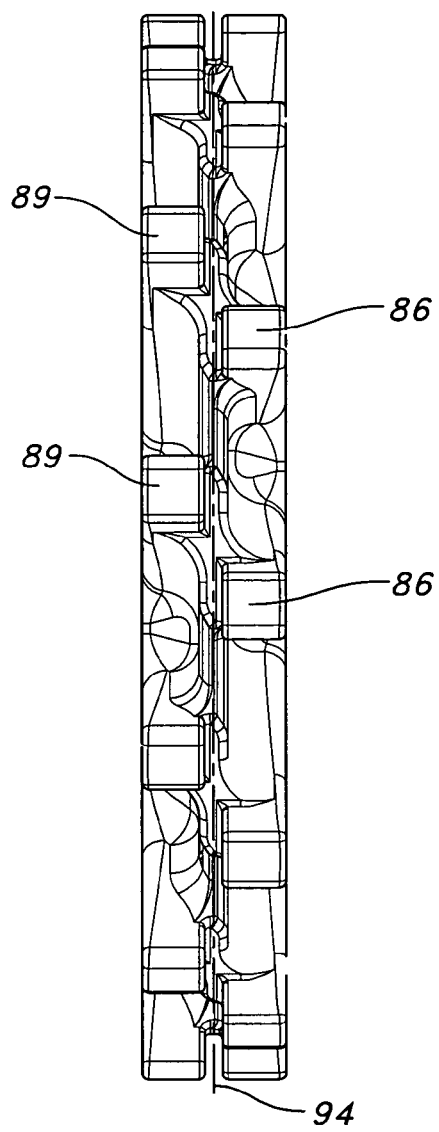
FIG. 8 is an end elevational view of the sprocket shown in FIG. 7.
Figure 9:
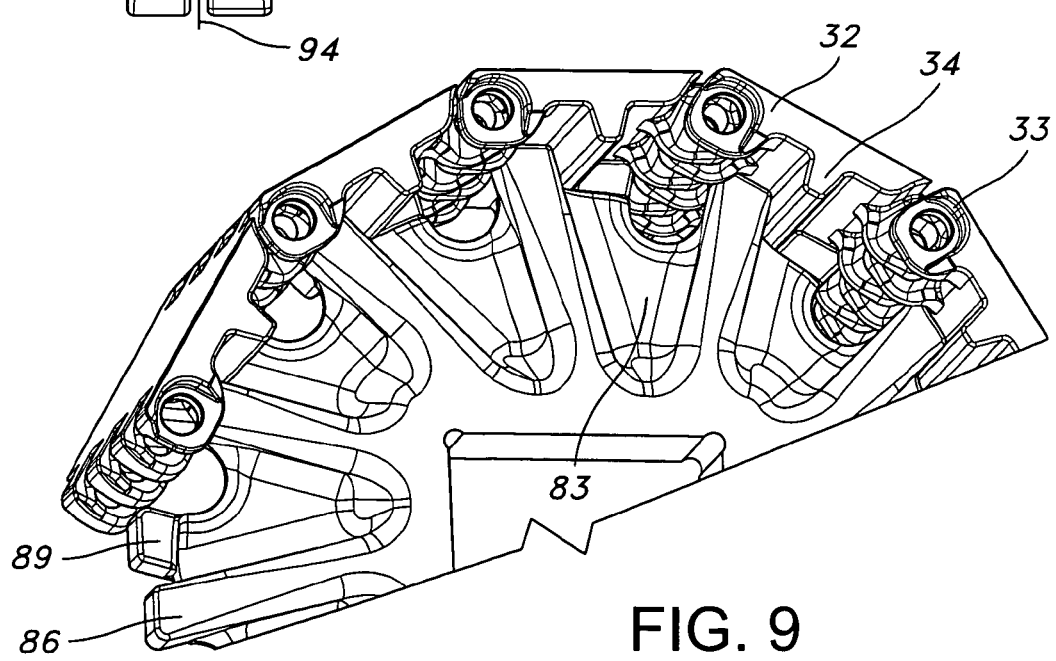
FIG. 9 is a perspective view of the sprocket shown in FIG. 7 with a belt engaged thereon.
Figure 10:
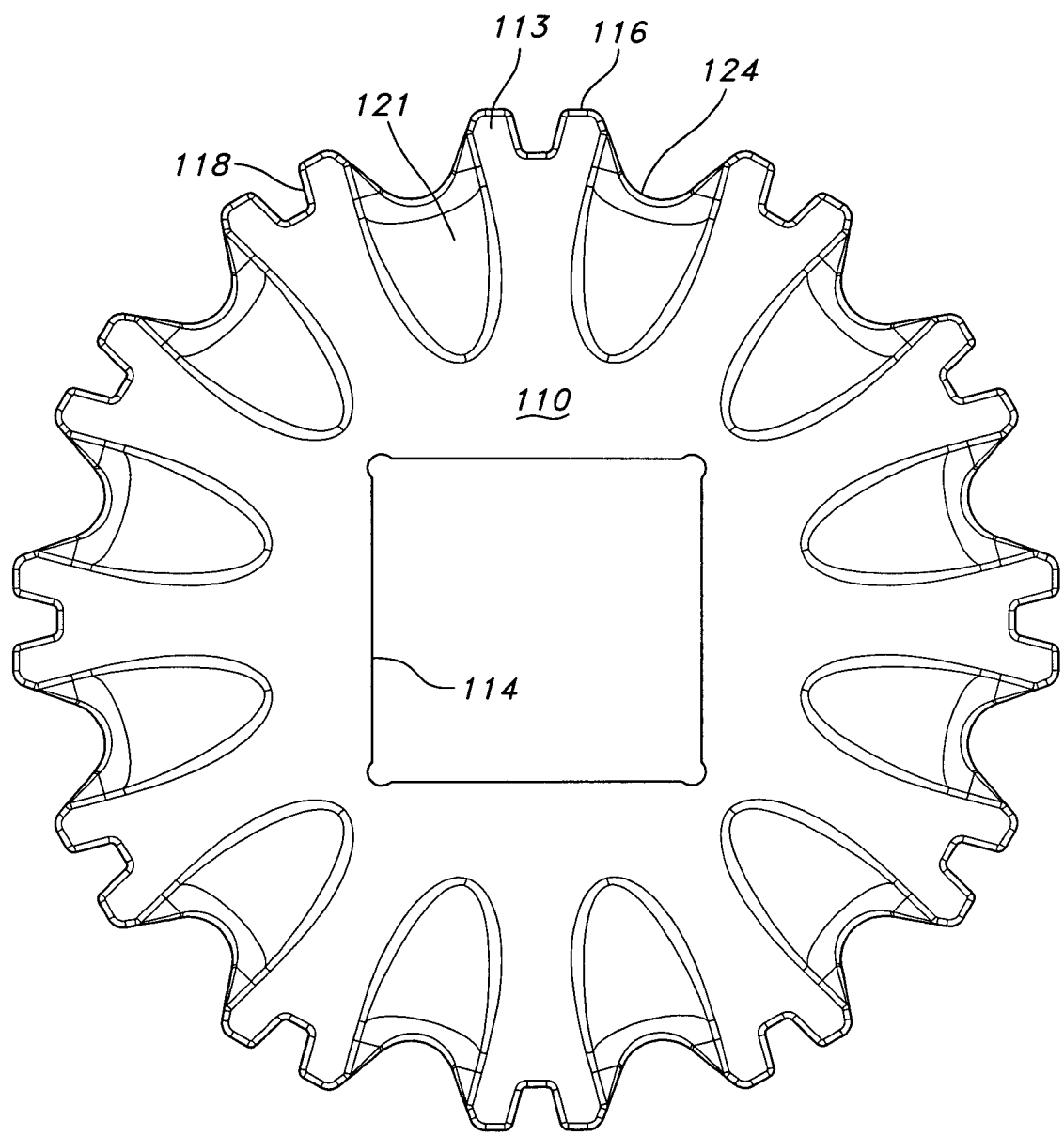
FIG. 10 is a side elevational view of another alternate embodiment of the present invention.

Turning to FIGS. 7-9, an alternate embodiment of the sprocket body that is particularly suitable for molding is shown. Sprocket 80 has a central opening 81 and has larger curved, recessed portions 83 that follow the offset (with respect to the circumference as best shown in FIG. 8) arrangement of the sprocket teeth pairs 86, 89. The teeth are disposed in pairs 91 with each tooth on opposite sides of a central axis 94. The curved recessed portion 83 extends from the end wall 92 of one tooth 86 to the end wall 95 of the next tooth 86 on the same side of the sprocket 80. A first opening 98 formed between adjacent teeth 86, 89 provides an opening around the hinge area. The pairs 91 of sprocket teeth 86, 89 provide for engagement of the transverse rib 34 and link end 33 of belt 32 as shown in FIG. 9. The recessed portion 83 is disposed at an angle β with respect to the radial axis 93. The angle β may be altered as necessary to improve the flow of the cleaning medium.

Figure 11:
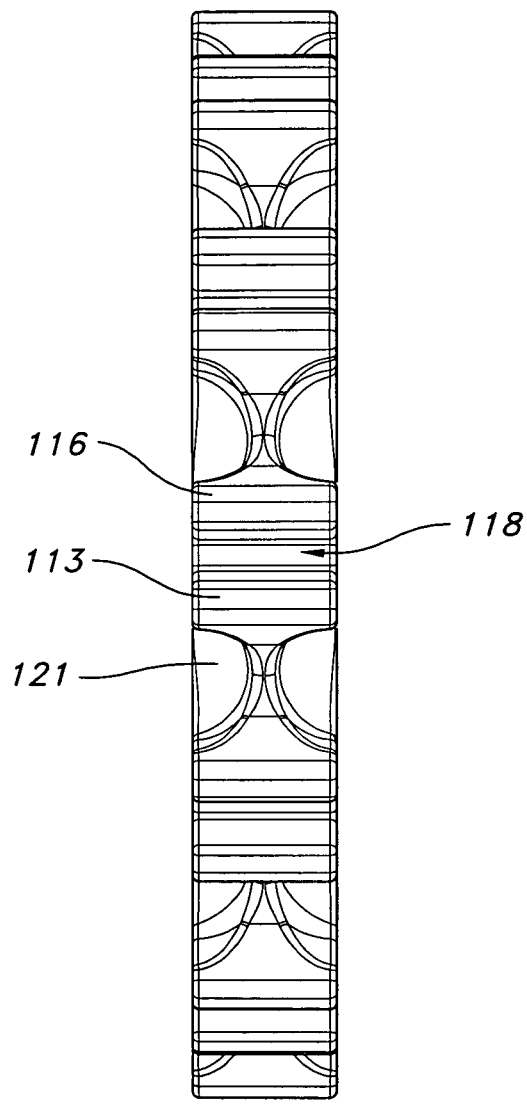
FIG. 11 is an end elevational view of the sprocket of FIG. 10.
Figure 12:
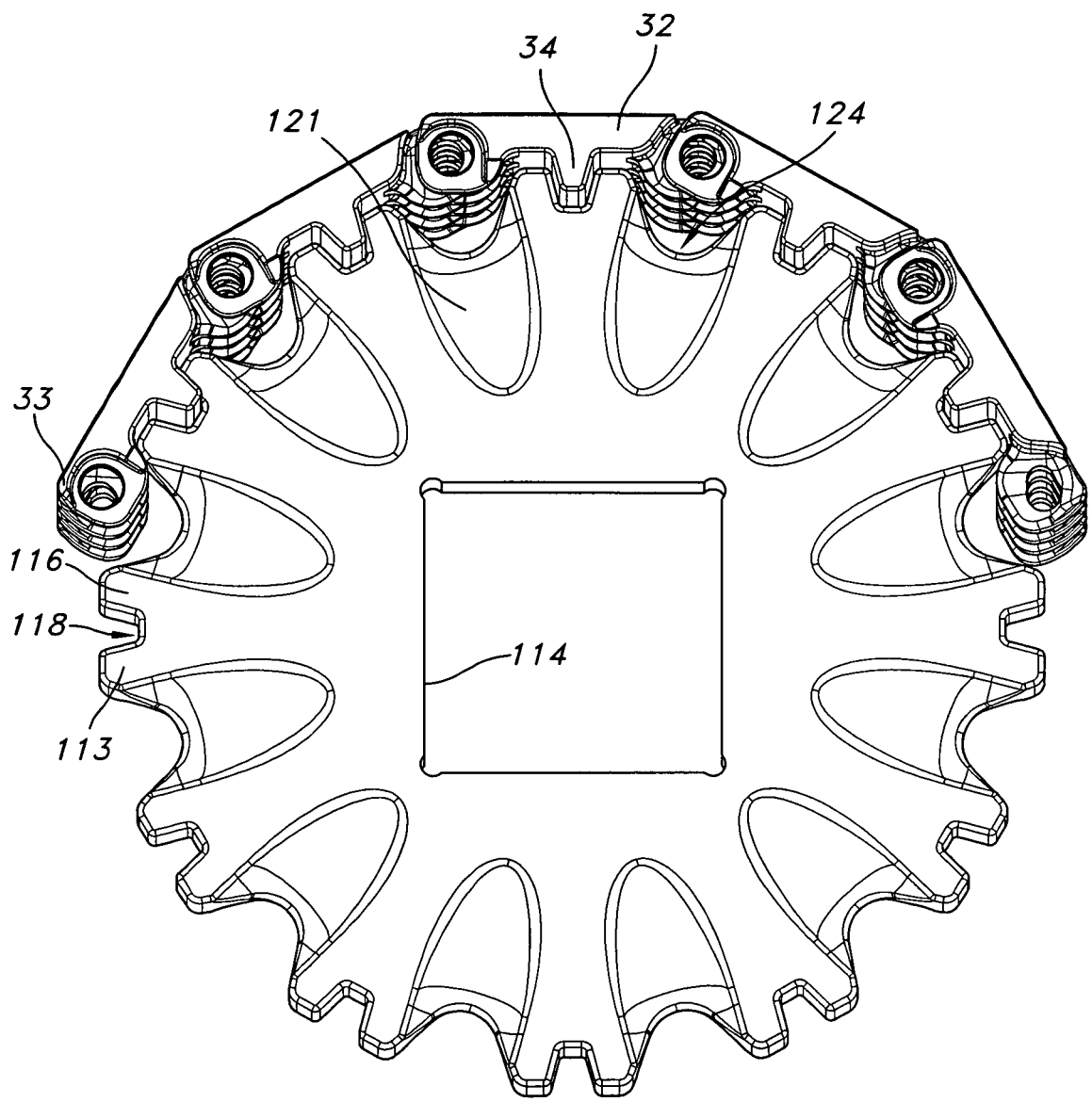
FIG. 12 is a side elevational view of the sprocket of FIG. 11 with a modular belt engaged thereon.
Figure 13:
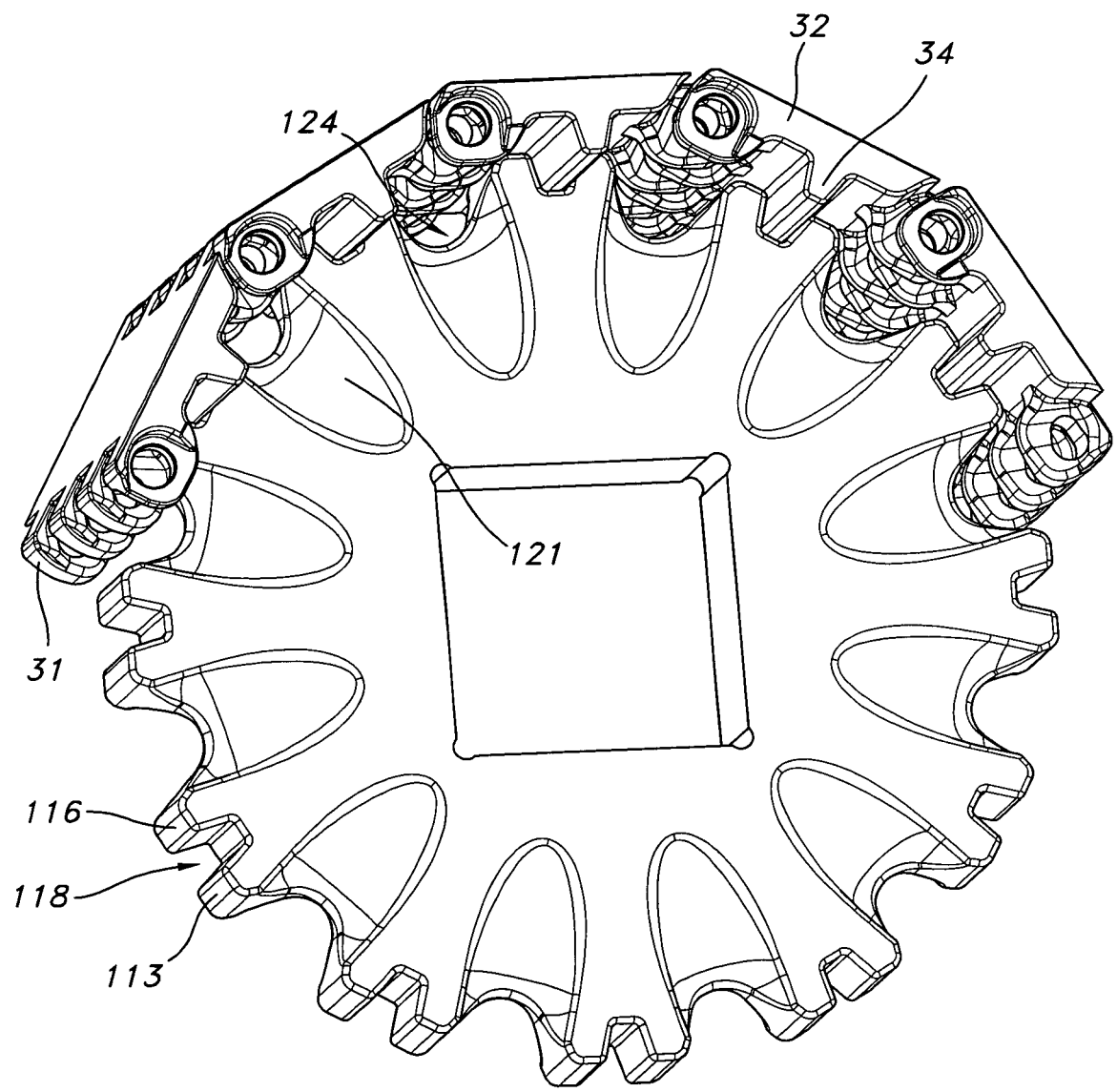
FIG. 13 is perspective view thereof.

Turning to FIGS. 10-13, an alternate embodiment of the sprocket is shown. Sprocket 110 has a central opening 114. Sprocket 110 increases the open space between the sprocket 110 and the hinge of the belt 32. The sprocket 110 may be used where tracking is not needed such as where the belt 32 is guided by guiding profiles on the edge of the belt 32. As best shown in FIG. 11, the sprocket 110 has a single row of teeth pairs 113, 116 without any offset. Due to the wider teeth 113, 116 and the closed V-shape of the space 118 between the teeth 113, 116, the sprocket 110 contact area is larger and may negatively effect the cleaning properties of the sprocket 110. The sprocket 110 also includes a curved, recessed portion 121. The recessed portion 121 extends to a first opening 124 that aligns with the hinge area of belt 32 as shown in FIG. 12.

Figure 14:
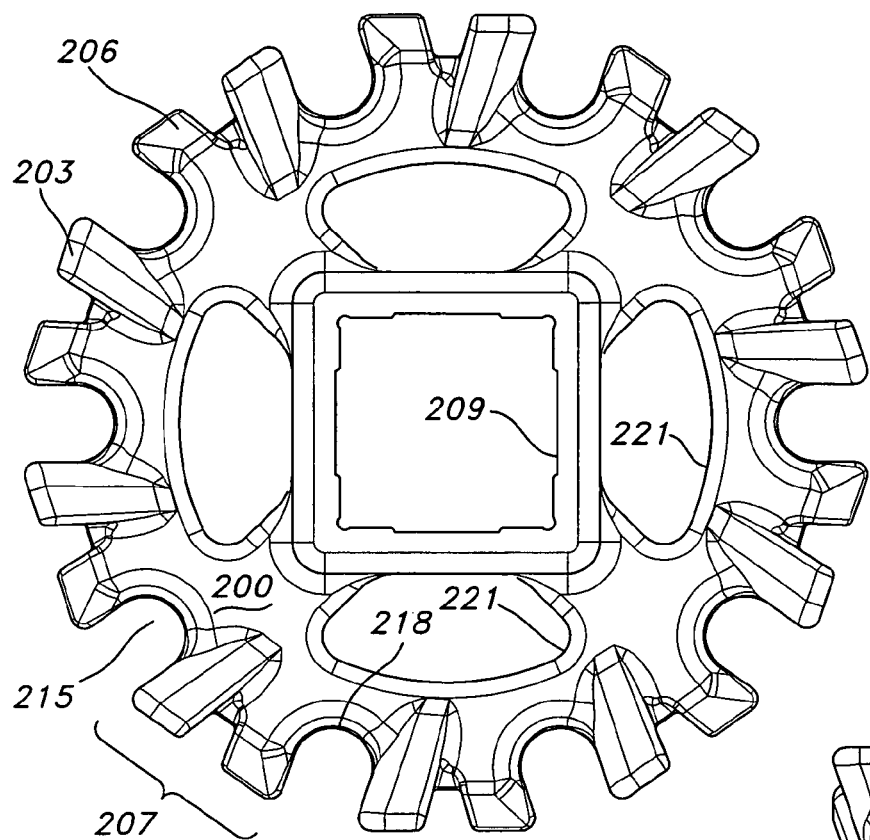
FIG. 14 is a side elevational view of another alternate embodiment of the present invention.
Figure 16:
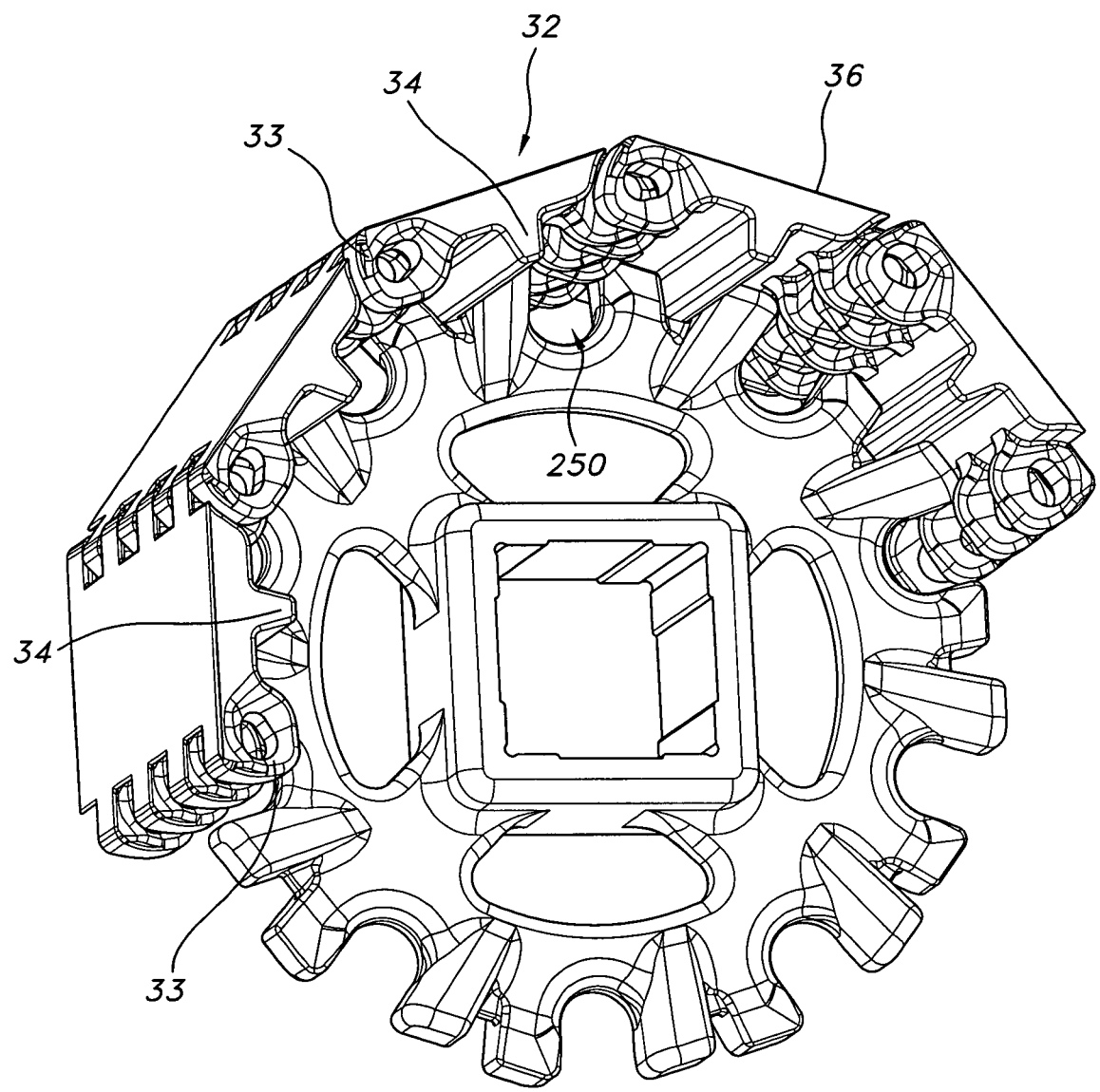
FIG. 16 is a perspective view of the sprocket of FIG. 14 with a belt engaged thereon.

Turning to FIG. 14, another embodiment of the sprocket is shown. A drive sprocket 200 has a plurality of sprocket teeth 203, 206 disposed in pairs 207 around the periphery of the sprocket 200. The sprocket 200 also has a central opening 209 that is formed in the shape of a square. The square shaped opening 209 is sized to receive a square shaft (not shown) for rotating the sprocket 200 to drive a modular belt 32 as shown in FIG. 16. A plurality of first openings 215 are disposed around the periphery of the sprocket 200 between the pairs 207. The first openings 215 extend inward toward the center of the sprocket 200 and terminate along a curved inner wall 218. A plurality of second openings 221 are disposed between the first openings 215 and the central opening 209. The second openings 221 may be desired to improve the accessibility of water jets or the like applied from the sides of the sprocket 200. Sprocket 200 does not include recessed portions or grooves below the first opening 215. The sprocket 200 is intended to have smooth surfaces with large openings to provide access to the hinge area of the belt and to allow easier cleaning of the sprocket itself.

Figure 15:
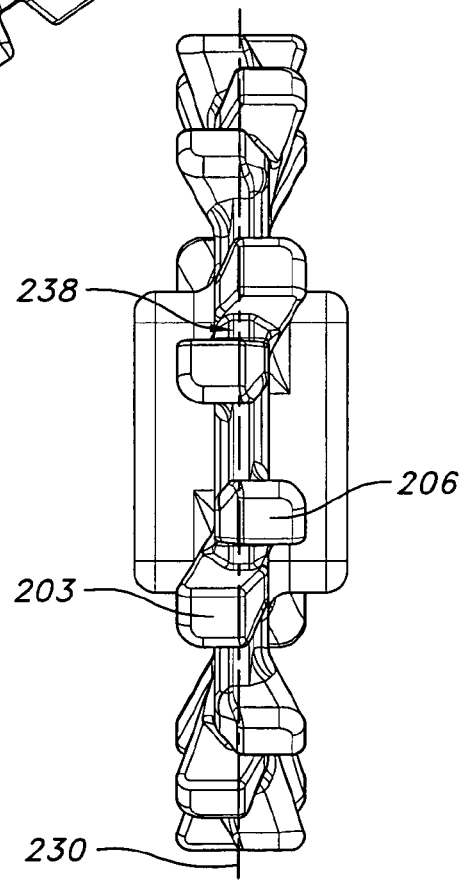
FIG. 15 is an end elevational view of the sprocket shown in FIG. 14.

In FIG. 15, the teeth 203, 206 are disposed in two rows along the periphery of the drive sprocket 200. The teeth 203, 206 are offset along the circumference of the sprocket 200 and are disposed on opposite sides of a central axis 230. During driving of the modular belt 32 one of the teeth engages with one of the link ends 33 of the belt 32 and another tooth engages with the transverse rib 34 on the belt 32. The transverse rib 34 on the belt 32 fits in the space 238 between the teeth 203, 206.

Turning to FIG. 16, the sprocket 200 is shown engaged with the modular belt 32. The teeth 203, 206 engage with the link ends 33 and transverse rib 34 of the respective modules 36. The teeth 203, 206 fit on opposite sides of the transverse rib 34 and provide tracking for the belt 32. Also, the first openings 215 provide large openings and improved access to the hinge areas for cleaning when the belt 32 passes over the drive sprocket 200. As indicated by arrow 250 the first openings 215 align with the hinge areas of the belt 32 as the belt 32 passes over the sprocket 200.

Figure 17:
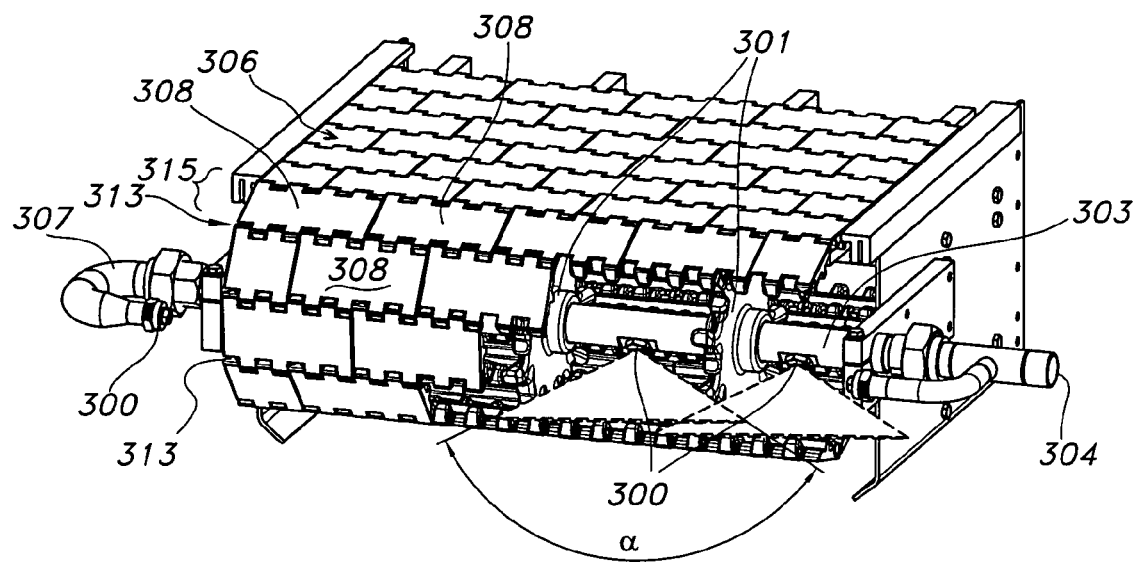
FIG. 17 is a perspective view of a modular belt traversing over sprockets and a cleaning-in-place system of the present invention.
Figure 18:
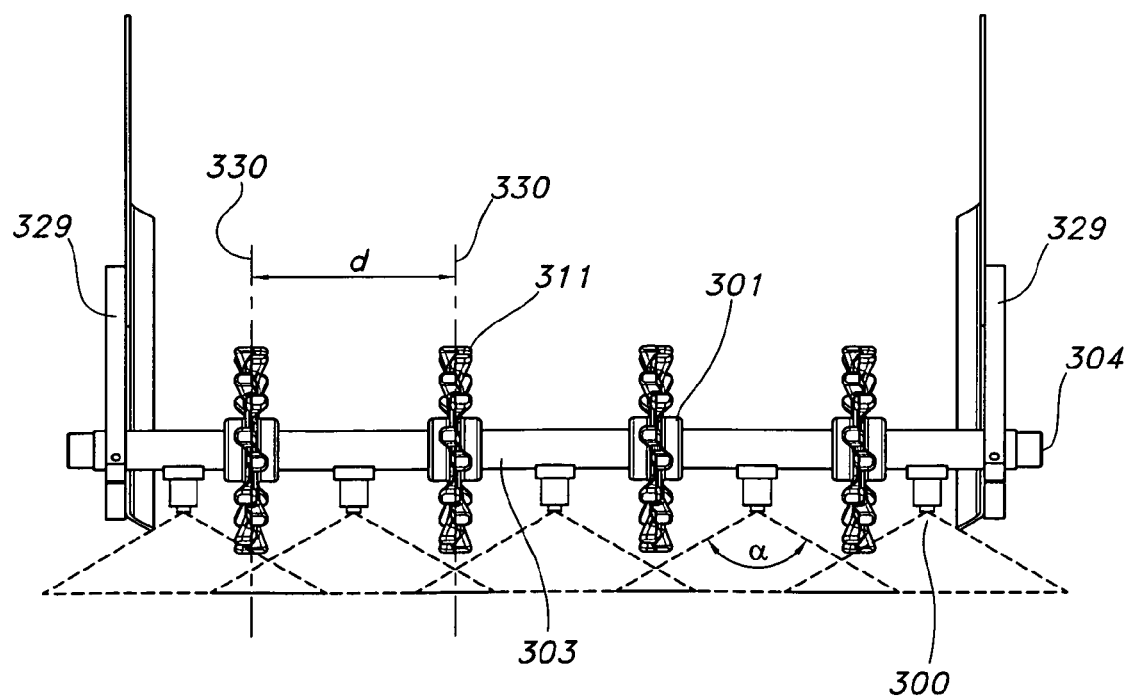
FIG. 18 is a perspective view of the cleaning-in-place system of the present invention.

The sprockets described above are designed such that the belt hinges are always open and freely accessible regardless of the position of the sprocket. This sprocket design combined with the spray techniques described in detail below provide for optimal cleaning of modular belts. As shown in FIGS. 17-21, spray nozzles 300 are located on a sprocket shaft 303. The shaft 303 comprises a stationary hollow shaft or thick-walled tube. The sprockets 301 rotate on the shaft 303 which may be constructed of steel or may be coated with a ceramic or plastic coating. The cleaning medium enters through an inlet 304 and passes through the hollow shaft 303 and exits the shaft 303 as a spray through the nozzles 300. As best shown in FIGS. 17 and 18, the nozzles 300 are primarily disposed on the shaft 303 between the sprockets. There may also be a nozzle 300 located at the end of a curved section 307 extending from the end of the shaft 303. Location of the nozzles 300 on the shaft 303 provides for an optimal spray angle α as described in greater detail below. The sprays are designed to be flat (best shown in FIG. 20) to minimize medium consumption and to improve the ability of the spray to enter into the gaps k (FIG. 19) between the sprocket teeth 311 and into the belt hinge 313.

The belt 306 is formed by rows 315 of belt modules 308 that are connected end to end in adjacent rows in bricklayed fashion as will be evident to those of ordinary skill in the art based on this disclosure. The adjacent rows 315 have intercalated link ends 319 (best shown in FIG. 19) that are connected by pivot rods to form hinges.

As described in greater detail below, the best cleaning performance at minimal cleaning medium consumption is achieved with a combination of spray angle and pressure, relative to the sprocket diameter (i.e., distance of spray nozzle from the belt surface). The temperature of the cleaning medium also needs to be adapted to the specific process. Also, the supply of the cleaning medium may be controlled by a customized program to limit the spray time for lowest possible use of cleaning medium. The program may be adapted to the specific requirements of the customer production process.

As shown in FIG. 17, the cleaning-in-place system of the present invention may be installed on the idling or non-driven shaft 303 of a modular conveyor belt 306. The belt 306 runs over a plurality of sprockets 301. The sprockets 301 are rotatably mounted on the stationary hollow shaft or thick-walled tube 303. The shaft 303 is equipped with a number of spray nozzles 300 positioned between the sprockets 301. The spray is directed to the inner side of the belt 306 as it passes over the sprockets 301. The spray is directed approximately radially and oriented to hit the surface of the belt 306 where the rows 315 of the belt 306 are deflected by the sprockets 301. As known to those of ordinary skill in the art, easily cleanable modular belts are designed to open their hinges when rounding sprockets or drums and therefore provide access to the hinges for cleaning and inspection. Accordingly, the spray is able to enter the hinges for proper cleaning. As described above, the design of the sprocket 301 itself is made in such a way that the hinges are not covered and therefore the cleaning medium can enter the hinges, which are the most critical areas of the belt with respect to contamination and cleaning.

Turning to FIG. 18, the cleaning-in-place system is shown with the belt 306 removed for clarity. The distance (d) between the center lines 330 of adjacent sprockets 301 determines the distance that the spray must travel and is determined by the spray angle α. With a larger spray angle the sprockets 301 could be placed farther apart. As shown, a pair of supports 329 hold the stationary shaft 303 in position. The spray patterns overlap at each side.

Figure 19:
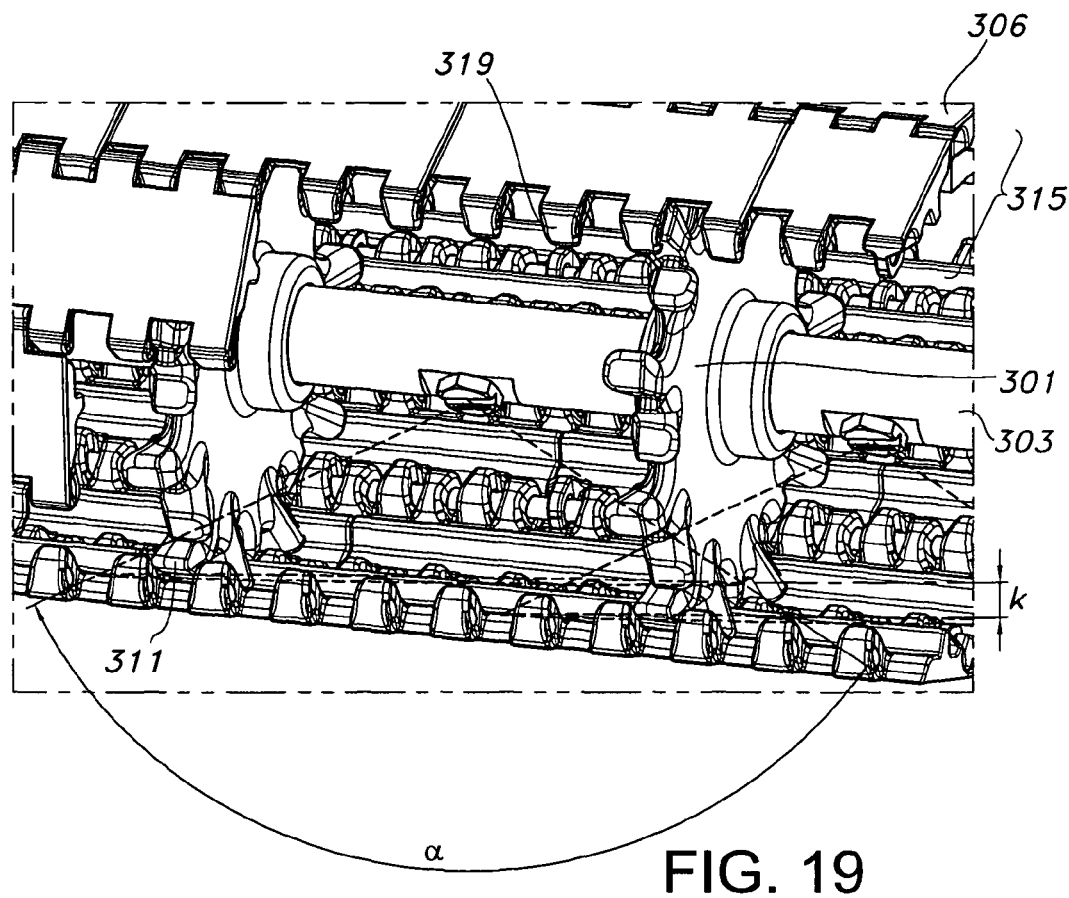
FIG. 19 is a perspective view of a belt traversing the cleaning-in-place system of the present invention, with a portion of the belt removed for clarity.

Turning to FIG. 19, the overlap of sprays is sufficient to allow the cleaning medium to enter into the belt hinge gaps and to enter through the slot-like openings k between the sprocket teeth.

Figure 20:
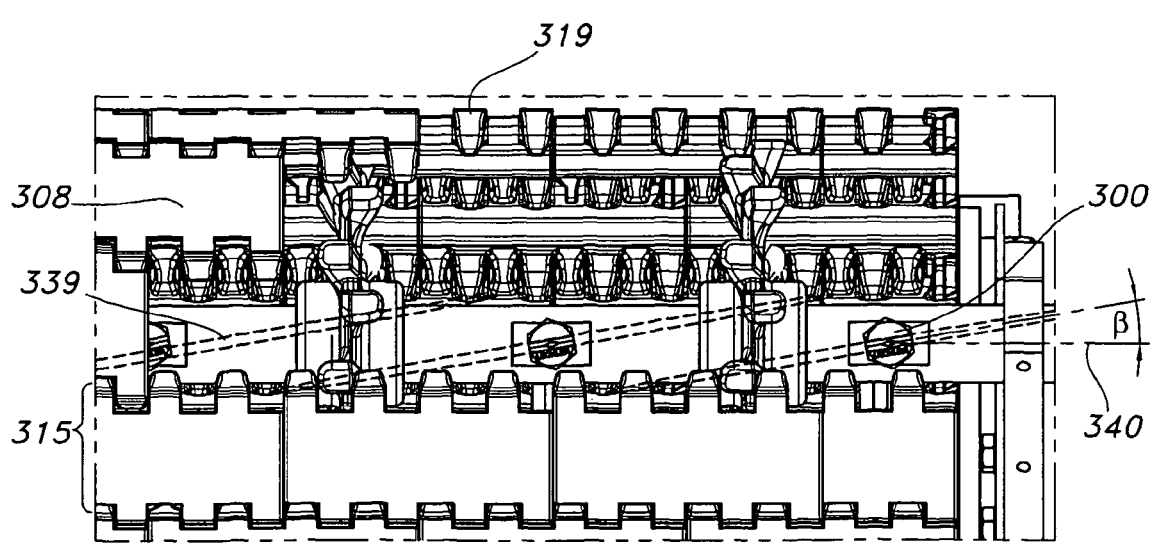
FIG. 20 is another perspective view of a belt traversing the cleaning-in-place system of the present invention, with a portion of the belt removed for clarity; and, FIG. 21 is a schematic diagram of the cleaning-in-place system of the present invention.

In FIG. 20, the spray nozzles 300 have a spray pattern 339 that is flat and therefore is better at entering the slot-like gaps k between the sprocket teeth and at entering the hinge gaps. The nozzles 300 are aligned at an angle β to the centerline 340 of the shaft 303. This angle is between five and fifteen degrees, and is preferably ten degrees. This angle avoids disturbance between the spray patterns of adjacent nozzles 300 and ensures the penetration of the spray fluid through the openings and gaps from both sides of the sprocket. As a result of the overlap, the belt surface can be fully covered.

The following table illustrates the spray configuration for a sprocket with a pitch diameter of 165 mm.

| | |
|---|---|
| Sprocket pitch diameter | 165 mm (6.5 in.) |
| Nozzle type | Lechler 612.487.16 |
| Spray angle | 120 degrees |
| Spray alignment | 10 degrees |
| Sprocket/nozzle increment | 150 mm (6 in.) |
| Number of nozzles per belt width | 6/m (2/ft.) |
| Fluid pressure (bar) | 2-10 bar (8 bar preferred) |
| Fluid consumption at 8 bar/nozzle | 3.19 liters/min. |

The sprocket pitch diameter should not be smaller than 130 mm (5 in.) and not larger than 200 mm (8 in.). For other sprocket sizes, the spray angles and/or the spray/sprocket distances have to be adjusted. The nozzle identified above is a well known brand that is commercially available from several sources. Other nozzles would also be suitable as will be evident to those of ordinary skill in the art based on this disclosure.

Figure 21:
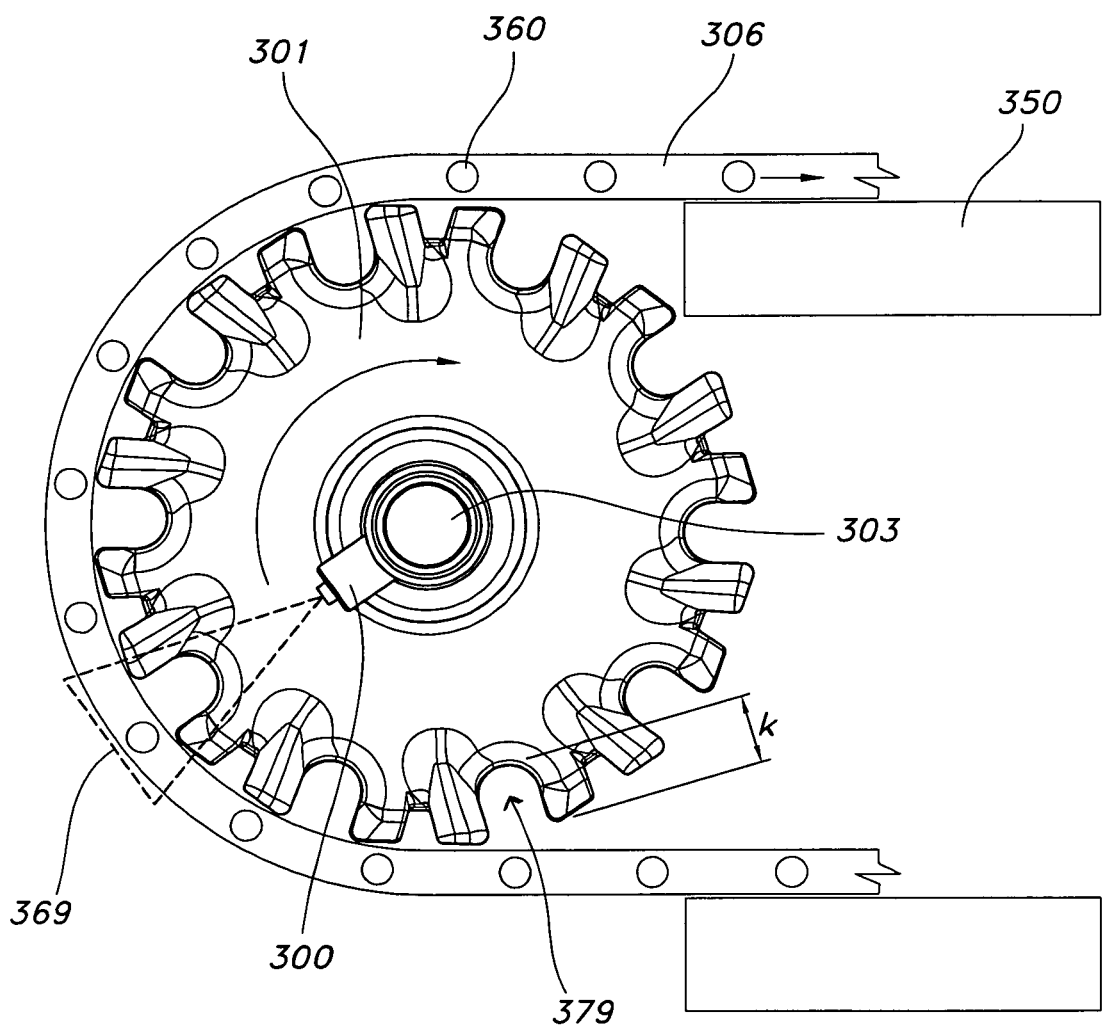

In FIG. 21, a belt 306 passes over a wear strip 350 and onto the sprocket 301. The sprocket 301 has large openings 379 that provide space around the hinges to keep the hinges open when the belt 306 traverses the sprocket 301. The belt is connected by pivot rods 360. The shaft 303 and the spray nozzle 300 are stationary. As shown, the spray is flat in the outward direction to provide better penetration of the cleaning medium into the slot-shaped spaces k between the teeth and into the hinge gaps.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A method of arranging a modular belt cleaning system, a modular belt having intercalated link ends connected by pivot rods to form pivoting hinge areas, the method comprising the steps of:
providing a cleaning-in-place system, comprising:
a non-rotating hollow shaft, having an open, first end adapted for fluid communication with a source of a fluid under pressure;

at least one sprocket rotatably mounted to the hollow shaft, the at least one sprocket rotating in driven relation about the shaft as the modular belt passes over and around the at least one sprocket;

a plurality of nozzle members mounted on the hollow shaft in laterally spaced relation to one another, each nozzle member being in fluid communication with the fluid under pressure; and aligning the nozzle members such that the nozzle members are configured to provide a flat spray pattern that is disposed at an angle of between five and fifteen degrees with respect to a longitudinal axis of the shaft.

2. The method of claim 1, wherein the at least one sprocket comprises a plurality of sprockets disposed along the shaft.

3. The method of claim 2, wherein at least one nozzle member is disposed between each pair of adjacent sprockets.

4. The method of claim 1, wherein the at least one nozzle member is aligned such that spray from the nozzle member passes through a first opening formed between adjacent pairs of teeth on the sprocket before the spray reaches the modular belt.

5. The method of claim 1, wherein the at least one nozzle member is aligned such that spray from a first nozzle member overlaps with the spray from a successive nozzle member, through the first opening.

6. The method of claim 1, wherein the nozzle members produce a spray pattern having a spray angle of ninety to one-hundred twenty degrees.

7. The method of claim 1, wherein the sprocket pitch diameter is 130 to 200 mm.

8. The method of claim 1, wherein the at least one sprocket comprises a body having an opening in the center for receiving the shaft, the body having a plurality of teeth disposed in pairs along a periphery of the body, the body having at least one first opening formed between adjacent pairs of teeth, the first opening extending toward the center of the sprocket and disposed in alignment with a hinge area of a modular belt to provide access to the hinge area for application of fluid when the modular belt engages the sprocket.

9. The method of claim 1, wherein the flat spray patterns are disposed at an angle of approximately ten degrees with respect to a longitudinal axis of the shaft.

* * * * *